Oct. 7, 1941.    R. SHEPPARD    2,258,224
VALVE TESTING APPARATUS
Filed July 8, 1938
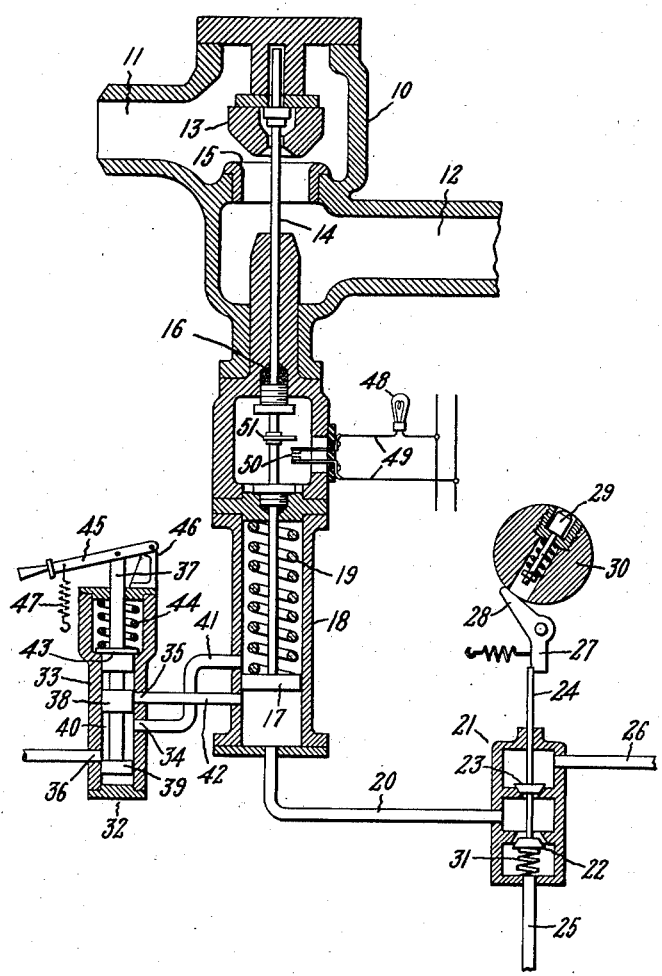
Inventor:
Raymond Sheppard,
by Harry E. Dunham
His Attorney.

Patented Oct. 7, 1941

2,258,224

UNITED STATES PATENT OFFICE 2,258,224

VALVE TESTING APPARATUS

Raymond Sheppard, Niskayuna, N. Y., assignor to General Electric Company, a corporation of New York Application July 8, 1938, Serial No. 218,247

6 Claims. (Cl. 73—51)

The present invention relates to valve testing arrangements for testing the free movability of servo motor operated valves such as emergency stop valves used in conjunction with elastic fluid turbines and provided in the inlet conduit thereof ahead of the control valves as regards the flow of elastic fluid therethrough. These emergency stop valves are provided to effect quick stopping of the flow of elastic fluid to the turbine or other consumer in case of emergency. Being operated only in emergency cases they may remain in one position, that is, in full opening position for a long time during which foreign matter contained in the elastic fluid may enter the packing sleeves for the stem or the packing sleeves and the stem may corrode, preventing free movement of the valve stem, should emergency call for closing the valve. Therefore it is desirable to test the valve from time to time to make sure that its free movability is not impaired. During the testing it is sufficient to move the valve slightly up and down without closing it. In fact, closing is most undesirable during the testing as it would completely interrupt the flow of elastic fluid through the valve and as it might take considerable time to reopen the valve once it is shut. This is true particularly with regard to unbalanced single disk emergency stop valves held in position by a small air pressure operated servo motor. In such a case, closing of the stop valve would necessitate subsequent closing of the control valve to balance the pressure across the stop valve and thereby to make it possible to reopen the latter by means of the comparatively small servo motor.

The object of my invention is to provide a valve testing arrangement whereby a valve, such as an emergency stop valve, may be readily tested as regards its free movability during operation without ever causing complete closing of the valve. This is accomplished by my invention by the provision of a bypass connected with the opposite sides of the piston in the servo motor and including a test valve which upon actuation permits displacement of a limited amount of fluid in the servo motor. The test valve is preferably biased into non-operative position so that upon actuation it returns automatically to such position.

For a better understanding of what I believe to be novel and my invention, attention is directed to the following description and the claims appended thereto in connection with the accompanying drawing.

The single figure of the drawing illustrates somewhat diagrammatically a valve testing arrangement in accordance with my invention.

The arrangement comprises an emergency stop valve having a casing 10 with an inlet 11 for connection to a source of elastic fluid and an outlet 12 for connection to a consumer. In the case of an elastic fluid turbine the outlet 12 is connected to a turbine valve chest containing control valves, not shown. A movable valve member 13 with a stem 14 is disposed in the casing 10 with the member 13 in cooperative relation with a valve seat 15. The stem 14 projects through a packing or sealing 16 and has a lower end connected to a piston 17 movably disposed in a cylinder 18 and biased in downward direction by a compression spring 19. The piston with the cylinder forms a servo motor. Operating fluid, in the present instance air under pressure, is conducted to the lower portion of the cylinder 18 by a conduit 20 which is connected to a reversing valve 21. The latter includes two movable valve members 22 and 23 secured to a stem 24. Ordinarily the valve 22 is in opening and the valve 23 in closing position. Air under pressure is supplied from a source through a conduit 25 past the valve 22 through the conduit 20 to the lower end of the servo motor cylinder 18. Upon reversal of the positions of the valves 22 and 23 the valve 22 disconnects the conduit 20 from the source of supply and the valve 23 connects the conduit 20 to a discharge conduit 26, permitting draining of fluid from the lower part of the cylinder 18 and thereby causing downward movement of the piston 17 and closing of the emergency stop valve 13. The stem 24 for the valves 22 and 23 is held in the normal position by means of a latch 27 which has a finger 28 in cooperative relation with an emergency governor 29 secured to a shaft 30. The latter may be a shaft of the turbine to be controlled. During emergency condition the emergency governor causes turning of the finger 28 whereby the latch 27 is removed from the stem 24, permitting upward movement of the latter into reversing position by the action of a compression spring 31.

In order to test the emergency stop valve, I provide means causing limited movement of the emergency stop valve without permitting it to move into closing position. This means includes a test valve 32 which has a cylinder 33 with ports 34, 35, 36 and a movable valve member 37. The valve member 37 has two valve heads 38 and 39 arranged so that the head 38 normally covers the port 35 while the space 40 formed between the heads permits communication of the ports 34 and 36. The port 34 is connected by a conduit 41 to the cylinder 18 above the piston 17 and the port 35 is connected by a conduit 42 to the cylinder 18 below the piston 17 so that normally the test valve permits discharge of fluid from the space above the piston 17 through the conduit 41 and the test valve port 36 which may be connected to atmosphere in the case of an air pressure operated servo motor. The movable valve member of the test valve is normally held in the position shown by means including a collar 43 fastened to the movable member of the test valve and biased towards a shoulder formed on the casing 33 by a compression spring 44.

During testing the movable valve member has to be moved upward. To this end it is connected to a hand lever 45 supported by a fulcrum 46 on the casing 33 and biased downward, that is, into normal position of the valve by a tension spring 47. Upon upward movement of the movable valve member 37 by actuation of the hand lever 45 the lower valve head 39 first covers the port 36, preventing further discharge of fluid from the upper side of the piston 17 in the servo motor cylinder 18 and thereafter the upper valve head 38 uncovers the port 35 and thereby establishes communication between the conduits 41 and 42. The latter then form a bypass with regard to the upper and lower side of the piston 17 in the cylinder 18, causing displacement of fluid under pressure from the lower side to the upper side. As pressure builds up on the upper side of the piston 17, the latter is forced downward. This movement continues until the piston 17 covers the port connection with the conduit 42 and stops further displacement of fluid between the upper and lower side of the piston and consequently prevents movement of the piston 17 into its lower end position in which the valve 13 would be shut. Upon actuation of the test valve by upward turning movement of the lever 45 the latter returns to its normal position by action of the springs 44 and 47. Thus, during testing of the valve 13, all that is necessary is to move the lever up and down a few times and see whether the emergency stop valve 13 moves freely. Movement of the valve 13 with its stem 14 during the testing operation is indicated by a signal lamp 48 forming part of an electric circuit 49 which includes contacts 50 and a contact-making member 51 secured to the stem 14. The circuit is normally open. Upon downward movement of the stem 14 the contact-making member 51 closes the contacts 50, whereupon the lamp 48 lights up, thus indicating movement of the stem 14.

Thus, with my invention I have accomplished an improved construction and arrangement for testing the operating condition of a hydraulic motor operated machine element such as a stop valve. Such hydraulic motor according to my invention has a pressure chamber with a first port through which operating fluid is displaced during normal operation and in addition another port between such first port and the normal operating position of the motor piston, which other port is connected to a valved conduit and upon actuation of the valve permits a limited displacement of operating fluid in the hydraulic motor.

Having described the method of operation of my invention, together with the apparatus which I now consider to represent the best embodiment thereof, I desire to have it understood that the apparatus shown is only illustrative and that the invention may be carried out by other means.

While I have described my invention as a valve testing arrangement, I desire to have it understood that it is not necessarily limited thereto and may be applied generally to the testing of the movability of machine elements having stems subject to sticking during operation, for example, in testing the operability of an emergency brake, an emergency door opener, a railroad cross-gate operator, etc.

What I claim as new and desire to secure by Letters Patent of the United States, is:

1. The combination with a valve having a stem and a fluid pressure operated servo motor having a piston connected to the stem, of means connected to the servo motor for testing the movability of the stem without causing complete closing of the valve, said means comprising a valved bypass connected to the motor on opposite sides of the piston for effecting a limited variation of fluid pressure in the servo motor.

2. Valve testing arrangement for a valve having a stem and a fluid pressure operated servo motor having a piston connected to the stem, comprising a bypass with a valve connected to the servo motor on opposite sides of the piston to check the movability of the stem, said bypass being automatically rendered ineffective in response to a limited movement of the stem.

3. Valve testing arrangement for a valve having a stem and a fluid pressure operated servo motor with a piston connected to the stem normally to hold the valve in open position, said arrangement including means for testing the movability of the stem without permitting the valve to be moved into closing position, said means comprising a bypass connected to the servo motor on opposite sides of the piston, a test valve in the bypass including means normally biasing the test valve into closing position, one end of the bypass being connected to the servo motor near the piston whereby a limited movement of the piston interrupts the flow of fluid through the bypass and renders it ineffective.

4. The combination with an emergency stop valve having a stem, a cylinder having a piston connected to the stem, a spring engaging the piston and means for supplying air under pressure to the cylinder normally to hold the valve in open position, of means for checking the movability of the valve stem without permitting closing of the valve, said means comprising a bypass connected to the cylinder on opposite sides of the piston and a valve having two heads connected in the bypass with one head normally closing the bypass and the space between the heads connecting one side of the piston with the atmosphere.

5. In a testing apparatus the combination with a fluid pressure casing having an opening, a stem slidably projecting through the opening and having sealing contact therewith, and a hydraulic motor for moving the stem, said motor having a casing and a piston connected to the stem and normally held in a fixed position, of means for effecting limited movement of the piston from its normal operating position into an intermediate position to test the movability of said stem, said means comprising a valved bypass connected to the casing on opposite sides of the piston, one end of the bypass being connected to a point of the hydraulic motor in proximity of the normal operating position of the piston to permit the discharge of only a limited amount of operating fluid from the motor.

6. In a testing apparatus the combination with a machine element having a casing with an opening, a stem having sliding fit in the opening, and a hydraulic motor including a casing forming a pressure chamber with a port and a piston movably disposed in the casing and connected to the stem, of means for effecting limited movement only of the piston from its normal position into an intermediate position to test the operating condition of the machine element, said means comprising a valved by-pass connected to the casing on opposite sides of the piston with one end of the bypass connected to a point of the casing between the port and the normal operating position of the piston.

RAYMOND SHEPPARD.